(12) United States Patent
Regenberg

(10) Patent No.: US 11,472,126 B2
(45) Date of Patent: Oct. 18, 2022

(54) ATTACHMENT PART FOR CONNECTING TO A STRUCTURAL PART

(71) Applicant: TELSONIC HOLDING AG, Bronschhofen (CH)

(72) Inventor: Claus Regenberg, Zirndorf (DE)

(73) Assignee: Telsonic Holding AG, Bronschhofen (CH)

( * ) Notice: Subject to any disclaimer, the term of this patent is extended or adjusted under 35 U.S.C. 154(b) by 0 days.

(21) Appl. No.: 17/125,264

(22) Filed: Dec. 17, 2020

(65) Prior Publication Data

US 2021/0101346 A1 Apr. 8, 2021

Related U.S. Application Data

(62) Division of application No. 16/495,120, filed as application No. PCT/EP2017/057081 on Mar. 24, 2017, now Pat. No. 10,906,250.

(51) Int. Cl.
*B29C 65/08* (2006.01)
*B29C 65/00* (2006.01)
(Continued)

(52) U.S. Cl.
CPC ........... *B29C 65/082* (2013.01); *B23K 20/10* (2013.01); *B29C 66/004* (2013.01); *B29C 66/1122* (2013.01); *B29C 66/53245* (2013.01); *B29C 66/61* (2013.01); *B29C 66/81431* (2013.01); *B29C 66/8322* (2013.01); *B23K 2101/006* (2018.08); *B29C 66/20* (2013.01); *B29L 2031/3005* (2013.01); *B29L 2031/3041* (2013.01); *B29L 2031/3044* (2013.01); *B29L 2031/3058* (2013.01); *B32B 3/266* (2013.01); *B60R 19/02* (2013.01)

(58) Field of Classification Search
CPC ................ B29C 65/082; B29C 66/004; B29C 66/1122; B29C 66/53245; B29C 66/61; B29C 66/81431; B29C 66/8322; B29C 66/20; B23K 20/10; B23K 2101/006; B29L 2031/3005; B29L 2031/3041; B29L 2031/3044; B29L 2031/3058
USPC .......................................................... 428/99
See application file for complete search history.

(56) References Cited

U.S. PATENT DOCUMENTS 3,893,223 A 7/1975 Mims
8,919,855 B2 * 12/2014 Ruiz Rincon ........ B62D 29/001
296/70

FOREIGN PATENT DOCUMENTS

DE 10 2014 226 955 A1 6/2016
EP 2 246 178 A1 11/2010
WO 2010/100225 A1 9/2010

OTHER PUBLICATIONS

Chinese Office Action Corresponding to 201780088843.3 dated Feb. 20, 2021.

* cited by examiner

*Primary Examiner* — Brent T O'Hern
(74) *Attorney, Agent, or Firm* — Finch & Maloney PLLC

(57) ABSTRACT

An attachment part for connecting to a structural part. The attachment part has an attachment part longitudinal axis, and a weld portion to be welded to the structural part by torsional ultrasonic welding. The weld portion has a contact surface for contact with a torsion sonotrode, and a weld surface for connecting to the structural part. The weld portion is delimited, at least portionally, by an inner vibration decoupling zone. The inner vibration decoupling zone, at least portionally, surrounds an inner portion of the attachment part.

16 Claims, 4 Drawing Sheets

(51) Int. Cl.
  *B23K 20/10*     (2006.01)
  *B29L 31/30*     (2006.01)
  *B23K 101/00*    (2006.01)
  *B32B 3/26*      (2006.01)
  *B60R 19/02*     (2006.01)

ATTACHMENT PART FOR CONNECTING TO A STRUCTURAL PART

This application is divisional of U.S. application Ser. No. 16/495,120 filed Sep. 18, 2019, which issued as U.S. Pat. No. 10,906,250 on Feb. 2, 2021 and which is a National Stage completion of PCT/EP2017/057081 filed Mar. 24, 2017.

FIELD OF THE INVENTION

The present invention relates to an attachment part for connecting to a structural part, to a method for connecting such an attachment part to a structural part, and to a composite part that includes such an attachment part and a structural part. The structural part may be, for instance, an external or internal facing part of a motor vehicle, for example a bumper, side panel, spoiler or sill. The attachment part may be a fastening means for fastening a functional part, for example a distance sensor.

BACKGROUND OF THE INVENTION

In the automotive industry, attachment parts are very frequently mounted on structural parts. For example, fastening means are mounted on bumpers, the fastening means then, for their part, holding one or more distance sensors. Such distance sensors may be part of a PDC ("park distance control" system or PLA ("park steering assistant") system. For some time now, such attachment parts have successfully been connected to the structural part by means of torsional ultrasonic welding.

EP 2 246 178 A1 discloses, for example, an attachment part having at least one weld point for welding to a structural part, the welding being effected by torsional ultrasonic welding, in which a sonotrode, for transmitting the vibrations that produce the weld operation, is placed onto the weld point, as a result of which the separating plane between the attachment part and the structural part fuses, and the attachment part becomes welded to the structural part. The weld point on the attachment part is decoupled from the rest of the surface of the attachment part in respect of vibration. As a consequence, the energy introduced by the sonotrode is to a very large extent transmitted onto the weld point, and is not released into the rest of the surface of the attachment part.

From WO 2010/100225 A1, an ultrasonic welding method for fastening a structural part to a functional part is known, wherein the structural part is fastened in a holder, and the holder is connected to the functional part. In order that the holders do not have to be specially designed for the functional part to which they are to be fastened, and there is no need for large-area bonding or welding surfaces on the holder, the method used is torsional ultrasonic welding, with a torsion sonotrode for transmitting the vibrations which produce the welding operation, to the holder to be welded, the holder being provided with first coupling elements, for coupling the vibrations of the torsion sonotrode into the holder, and with second coupling elements, for coupling the vibrations in the first coupling, induced by the torsion sonotrode, into the functional part, and the vibrations of the torsion sonotrode being thereby transmitted during the welding operation to the coupling elements and, via the coupling elements, to the functional part, and thus welding the holder to the functional part.

In DE 10 2014 226 955 A1, an attachment part for connection to a structural part is disclosed, wherein the attachment part has a weld portion to be welded to the structural part by means of torsional ultrasonic welding, wherein the weld portion has a contact surface for contact with a torsion sonotrode, and has an opposite weld surface for connection to the structural part, and wherein the weld portion is surrounded, at least portionally, by an outer vibration decoupling zone. The weld portion is realized in the form of a ring, and is delimited, at least portionally, by a ring-shaped, inner vibration decoupling zone. Such an attachment part can be securely and reliably welded to a structural part. The weld connection in this case is produced by use of a reduced ultrasonic power. An opposite, visible surface of a structural part is not affected by the production of the ultrasonic weld connection. This is also the case, advantageously, if the opposite, visible surface is already provided with a coat of paint.

Owing to the ever-evolving variety of shapes in the automotive sector, the space in which the attachment part, any functional part to be fastened thereto and the torsion sonotrode required for welding can be positioned is in many cases very limited. This is due, for example, to predetermined curvatures and edges of the structural parts, for example of the bumpers, in the region of the point at which the attachment part is to be fastened. Furthermore, many known attachment parts are comparatively large and, because of the greater material requirement, also comparatively heavy. Moreover, many known attachment parts are comparatively stiff, resulting in the risk of distortions due to strain in the structural part. For example, such distortions may occur on the visible side of a bumper. These surfaces, which are usually painted, are particularly critical if they are located in a region that is directly visible, resulting in categorization as "class A surfaces" and "class B surfaces".

SUMMARY OF THE INVENTION

It is therefore an object of the present invention to overcome the disadvantages of the state, and in particular to provide an attachment part for connecting to a structural part, and a method for connecting an attachment part to a structural part, which render advantageous torsional ultrasonic welding accessible also for such structural parts that allow only a limited space in which the attachment part, and any functional parts to be fastened thereto, can be positioned and in which the torsion sonotrode required for welding can be introduced. Advantageously, the attachment part is to be as small and light as possible, and not very stiff, in order to prevent distortions on the structural part.

In a first aspect of the invention, this object is achieved by an attachment part for connecting to a structural part. The attachment part has an attachment part longitudinal axis, and a weld portion to be welded to the structural part by means of torsional ultrasonic welding. The weld portion has a contact surface for contact with a torsion sonotrode, and a weld surface for connecting to the structural part. The weld portion is delimited, at least portionally, by an inner vibration decoupling zone.

According to the invention, the inner vibration decoupling zone, at least portionally, is inclined in relation to the attachment part longitudinal axis or is parallel thereto. Within the meaning of the present invention, the inner vibration decoupling zone is inclined in relation to the attachment part longitudinal axis if the angle formed between it and the attachment part longitudinal axis is greater than 0°, but less than 90°. This is in contrast to inner vibration decoupling zones that extend within a plane that is perpendicular to the attachment part longitudinal axis, such as is disclosed, for example, in DE 10 2014 226 955 A1 cited above.

The inclination or parallelism in relation to the attachment part longitudinal axis has the advantage that, for a predefined inner diameter of the inner vibration decoupling zone, a smaller outer diameter of the inner vibration decoupling zone can be achieved. It is thus also possible to achieve a smaller weld portion and a lesser overall dimension of the attachment part perpendicular to the attachment part longitudinal axis. A smaller weld portion, in turn, has the positive effect that a smaller torsion sonotrode can be selected, which can be more easily positioned in the space allowed by the structural part.

Conversely, the inclination or parallelism in relation to the attachment part longitudinal axis has the advantage that, for a predefined outer diameter of the inner vibration decoupling zone, the selected inner diameter of the inner vibration decoupling zone can be larger, with the result that larger functional parts, such as, for example, larger distance sensors, can be accommodated.

Preferably, the inner vibration decoupling zone is realized substantially in the form of a conical surface. This enables the attachment part to be produced more easily, for example if it is composed of plastic and is produced by an injection molding process.

The inner vibration decoupling zone preferably extends at an angle in relation to the attachment part longitudinal axis, which angle is in the range of from 3° to 35°. The smaller this angle, the greater is the saving in space perpendicular to the attachment part longitudinal axis. An angle of at least 3°, however, enables the production of some embodiments of the attachment part to be facilitated; for example, in the case of production by injection molding, such an angle can provide for an advantageous demoulding draft.

According to an advantageous design, the inner vibration decoupling zone, at least portionally, surrounds an inner attachment part portion. Preferably, the inner attachment part portion in its entirety is to a large extent decoupled, by a continuous circumferential inner vibration decoupling zone, in respect of the transmission vibrations. As a consequence, an ultrasonic energy introduced into the weld portion is largely transmitted to the weld surface. A weld connection is thus produced in a secure and reliable manner with a reduced expenditure of energy.

The inner attachment part portion may have a through-hole arranged concentrically in relation to the inner vibration decoupling zone. The provision of a central through-hole in the attachment part enables weight to be saved.

According to a further design, the inner attachment part portion has a plurality of fastening portions, arranged concentrically with respect to the through-hole, for fastening a functional part realized to correspond to the fastening portions. The functional part may be, for example, a distance sensor of a motor vehicle. The fastening portions may comprise holding and latching lugs that extend substantially parallel to the attachment part longitudinal axis.

Advantageously, the weld portion is surrounded, at least portionally, by an outer vibration decoupling zone. The introduction of vibrations into an outer attachment part portion, described in the following, can thereby be reduced.

According to a further advantageous design, an outer attachment part portion extends, at least portionally, radially outside of the outer vibration decoupling zone. The outer attachment part portion need not be rotationally symmetrical with respect to the attachment part longitudinal axis. In some embodiments, the outer vibration decoupling zone is surrounded by the outer attachment part portion. The outer attachment part portion may be rotationally symmetrical with respect to the attachment part longitudinal axis, or—depending on the geometry of the structural part to which the attachment part is to be connected—have a different geometry.

According to a further, particularly advantageous design of the invention, the inner vibration decoupling zone and/or the outer vibration decoupling zone are/is formed by a multiplicity of decoupling openings and/or by one or more thinned regions of material. The decoupling openings may be, for example, round, trapezoidal, oval or in the form of a slot. The design of the second through-openings depends on the stiffness of the material used to produce the attachment part, and on its thickness.

According to a further advantageous design, the weld surface is formed by at least one rib extending from the weld portion. Expediently, the rib extends concentrically in relation to the attachment part longitudinal axis. It may be circumferential. The rib may be composed of a plurality of circumferentially arranged rib portions. Expediently, the rib tapers conically in cross section, and has an application surface for application to the structural part. Consequently, at the start of torsional ultrasonic welding, a contact surface between the rib and the structural part is at first smaller, such that initially a high ultrasonic energy and a high pressure act upon the contact surface. This facilitates and accelerates the welding operation.

According to a further advantageous design, the weld portion and the outer attachment part portion form a common plate. In particular, the outer attachment part portion is designed such that, when in a fastened state, it lies on a surface, in particular an inner surface, of the structural part. The outer attachment part portion may be used, in particular, to produce a bonded connection to the structural part. Such a bonded connection may be necessary, for example, in the case of repair.

The attachment part is preferably composed of a plastic. This provides for a stable connection to the structural part by torsional ultrasonic welding, in particular if the structural part is likewise composed of plastic. The attachment part may be produced, for example, by an injection molding process.

In the direction of the attachment part longitudinal axis, the attachment part may have a height that is at least 10 mm, preferably at least 20 mm, particularly preferably at least 40 mm. Perpendicularly in relation to the attachment part longitudinal axis, it may have an extent that is at least 15 mm. The weld portion may have a thickness in the range of from 0.8 mm to 3.0 mm, preferably in the range of from 1.0 mm to 1.6 mm.

A further aspect of the invention relates to methods for connecting an attachment part according to the invention to a structural part, having the following steps:
  a) bringing the weld surface of the attachment part into contact with a weld region of the structural part,
  b) exerting a force upon the contact surface by means of a torsion sonotrode, such that the weld surface is pressed against the weld region, and
  c) introducing a torsional ultrasonic vibration into the weld portion by means of the torsion sonotrode, such that the weld surface becomes welded to the weld region.

According to the invention, the torsional ultrasonic welding method is thus used to produce a connection of an attachment part to a structural part, the attachment part having a weld portion and being delimited, at least portionally, by an inner vibration decoupling zone, the inner vibration decoupling zone being inclined in relation to the attachment part longitudinal axis or parallel thereto, at least portionally. The advantages already explained above are thereby obtained. In particular, it is possible to use structural parts that allow only a limited space in which the attachment part, any functional part to be fastened thereto, and the torsion sonotrode required for welding can be positioned.

Insofar as the structural part allows, it may be advantageous in some situations if, before step b), at least a part of the structural part is deformed, by action of the torsion sonotrode, in such a manner that the torsion sonotrode can be brought into contact with the contact surface. The deformation can be reversed, at least partly, before and/or during and/or after step c). As a result of such a temporary deformation, yet further structural parts are accessible to the method according to the invention.

The torsion sonotrode may have a torsion-sonotrode longitudinal axis that coincides with the torsion axis of the torsional vibrations effected by it. It may have a work surface that, in steps b) and c), is pressed onto the contact surface of the attachment part. The work surface may be realized in the form of a ring. It may be perpendicular to the sonotrode longitudinal axis, or have a different, cylindrically symmetrical three-dimensional shape with respect to the sonotrode longitudinal axis.

The torsion sonotrode may additionally have a cavity for at least partially receiving the attachment part during step c). To further facilitate the positioning of the torsion sonotrode, or even render it possible at all, the cavity may be circumferentially delimited by a wall, the outer side of which widens, at least portionally, in the direction of the sonotrode longitudinal axis and away from the work surface. It is then necessary only for the portion of the wall arranged between the widening and the work surface, and thus the contact surface, to be introduced into a space that is possibly constricted by the geometry of the structural part.

In order for a space constricted by the geometry of the structural part to be made accessible, it may likewise be advantageous if, before step c), the sonotrode longitudinal axis is arranged, at least temporarily, at an angle in relation to the attachment part longitudinal axis. This angle is preferably less than 20°.

A further aspect of the invention is a composite part that includes an attachment part according to the invention and a structural part, wherein the weld surface of the attachment part is welded to a weld region of the structural part. The composite part may be produced, for example, by means of the method according to the invention.

Both in the method according to the invention and in the composite part according to the invention, the structural part may be an external or internal facing part of a motor vehicle, for example a bumper, side panel, spoiler or sill. The attachment part may be a fastening means for fastening a functional part, for example a distance sensor.

BRIEF DESCRIPTION OF THE DRAWINGS

The invention is explained in greater detail in the following of exemplary embodiments and drawings. Shown therein

DETAILED DESCRIPTION OF THE PREFERRED EMBODIMENTS

Figure 1:
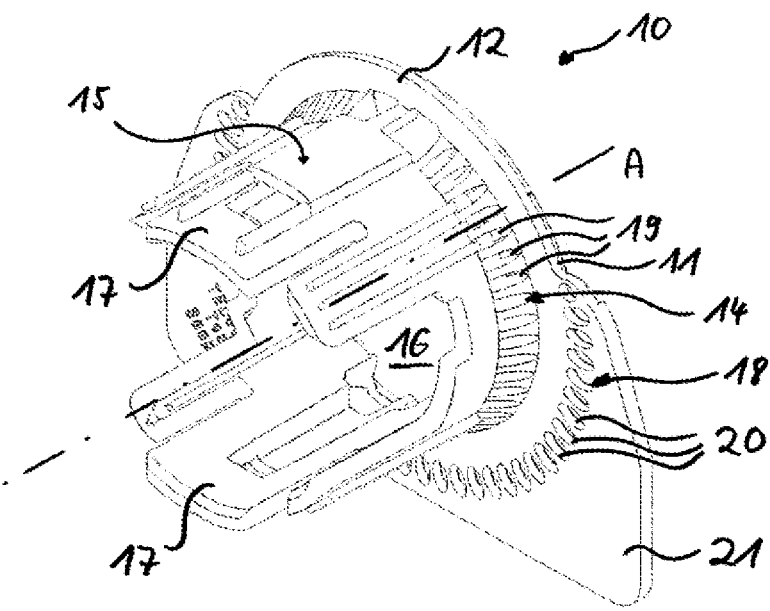
FIG. 1: a perspective view of an attachment part according to the invention.
Figure 2:
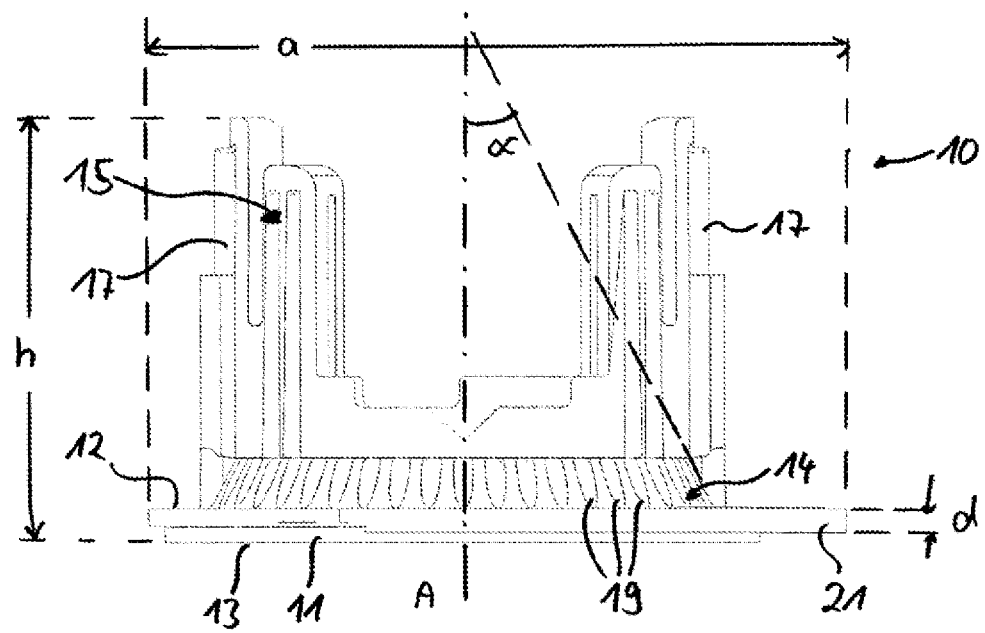
FIG. 2: a side view of the attachment part.
Figure 3:
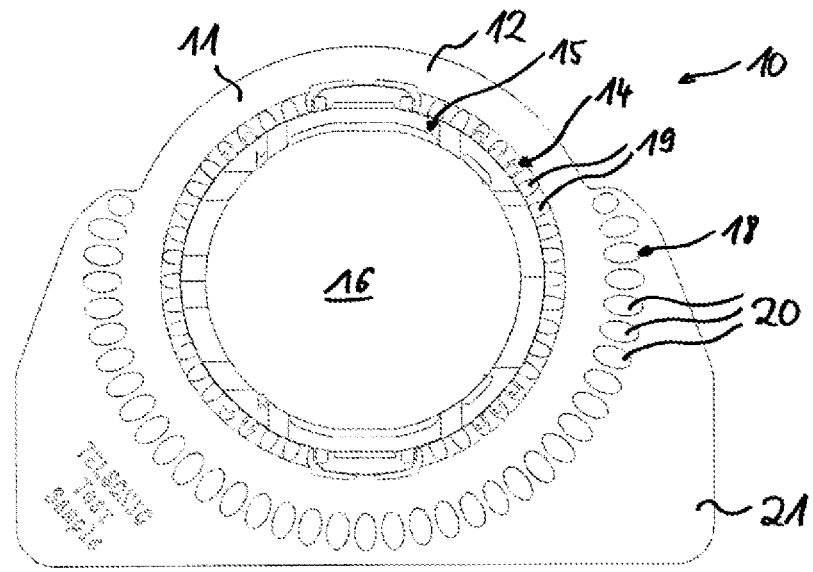
FIG. 3: a top view of the attachment part.
Figure 4:
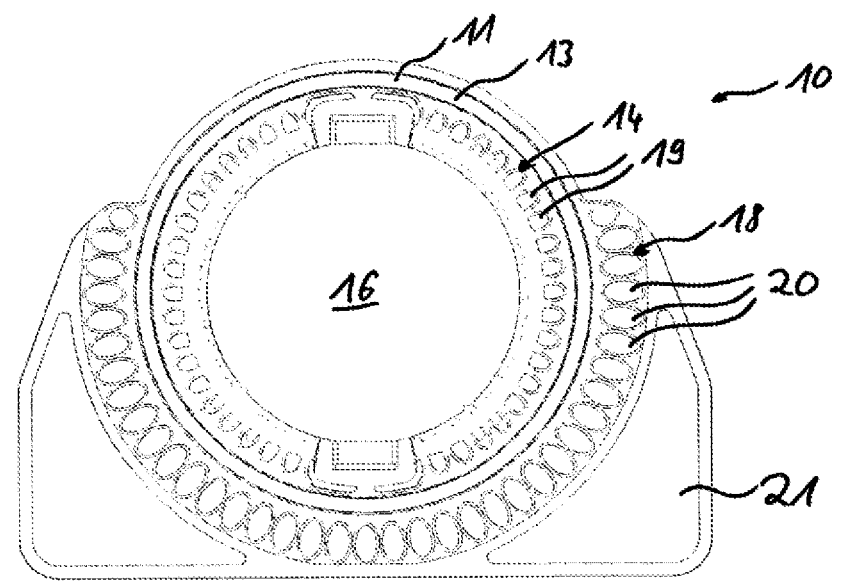
FIG. 4: a bottom view of the attachment part.
Figure 5:
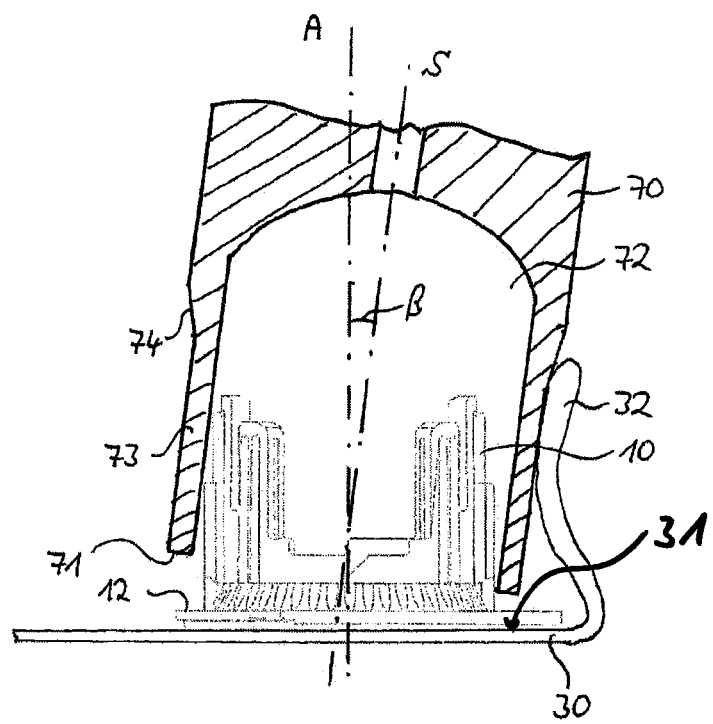
FIG. 5: a method according to the invention for connecting the attachment part to a bumper, at a first time-point.
Figure 6:
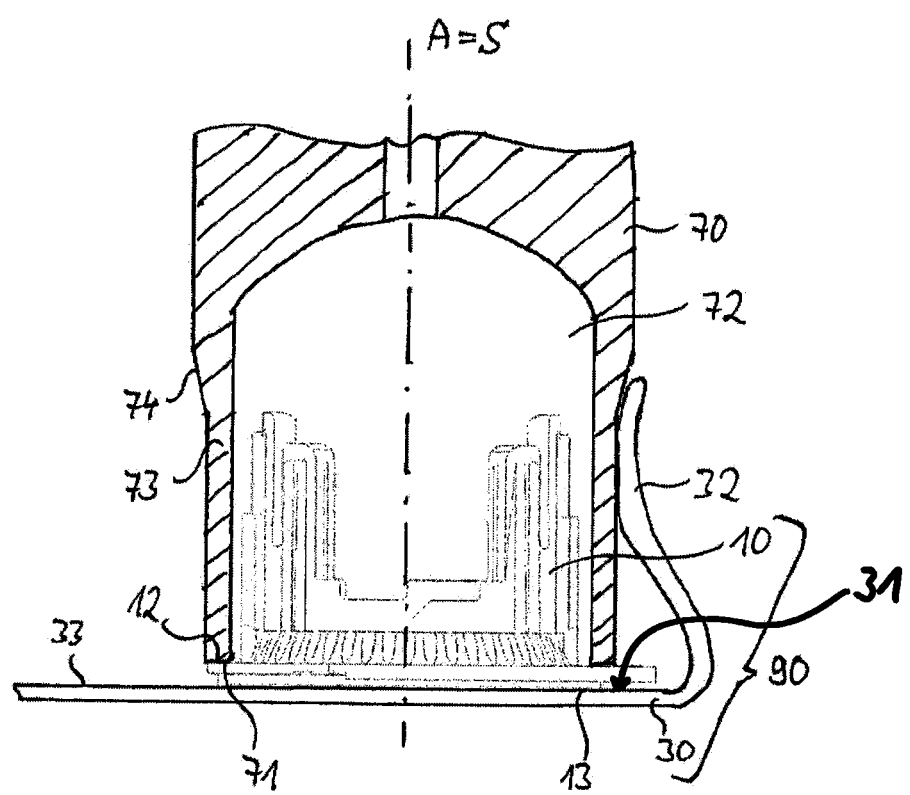
FIG. 6: a method according to the invention, at a subsequent, second time-point.

The attachment part 10 represented in FIGS. 1 to 4, which is composed, for example, of a plastic, and which may be produced by an injection molding process, includes a weld portion 11 for contact with a torsion sonotrode 70 (for which see FIGS. 5 and 6). The weld portion 11 is oriented perpendicularly in relation to an attachment part longitudinal axis A, and has a contact surface 12, realized substantially in the form of a ring, for contact with the torsion sonotrode 70. Opposite the contact surface 12 there is a weld surface for connection to a structural part (for which see also FIGS. 5 and 6). The weld surface is formed by a rib 13 extending from the weld portion 11.

The weld portion 11 is delimited inwardly by an inner vibration decoupling zone 14, and surrounded outwardly, in portions, by an outer vibration decoupling zone 18, which in turn is surrounded portionally by an outer attachment part portion 21. The weld portion 11 and the outer attachment part portion 21 form an, in particular flat, common flat plate. The inner vibration decoupling zone 14 is inclined in relation to the attachment part longitudinal axis A. More precisely, it is realized substantially in the form of a conical surface, and extends at an angle α in relation to the attachment part longitudinal axis A, which angle may be in the range of from 3° to 35°. This inclination has the advantage that, for a predefined inner diameter of the inner vibration decoupling zone 14, a smaller outer diameter of the inner vibration decoupling zone 14 can be achieved. Conversely, for a predefined outer diameter of the inner vibration decoupling zone 14, the selected inner diameter of the inner vibration decoupling zone 14 can be larger.

The inner vibration decoupling zone 14 surrounds an inner attachment part portion 15, which has a through-hole 16 arranged concentrically in relation to the attachment part longitudinal axis A1. The inner attachment part portion 15 has a plurality of fastening portions in the form of holding and latching lugs 17, arranged concentrically with respect to the attachment part longitudinal axis A, for fastening a functional part, for example a distance sensor, realized to correspond to the holding and latching lugs 17.

The inner vibration decoupling zone 14 and the outer vibration decoupling zone 18 are formed by a multiplicity of adjacently arranged, oval vibration decoupling zone 19 and 20, respectively. The through holes 20 each form segment-shaped zones, concentrically with respect to the attachment part longitudinal axis A.

In the direction of the attachment part longitudinal axis A, the attachment part 10 has a height h=25 mm, and perpendicularly in relation to the attachment part longitudinal axis A has an extent a=35 mm. The weld portion 11 has a thickness d=1.0 mm. The attachment part 10 is comparatively small and light, and not very stiff, thereby making it possible to prevent unwanted distortions on a bumper 30.

FIG. 5 shows a part of a method according to the invention for producing an ultrasonic weld connection of the attachment part 10, as claimed in FIGS. 1 to 4, to a bumper 30, at a first time-point.

A torsion sonotrode 70 used for welding includes a sonotrode longitudinal axis S that coincides with the torsion axis of the torsional vibrations effected by it. It additionally includes a work surface 71, which is flat and realized in the form of a ring, and which is perpendicular to the sonotrode longitudinal axis S. Furthermore, it includes a cavity 72. The cavity 72 is delimited circumferentially by a wall 73, the outer side 74 of which widens in the direction of the sonotrode longitudinal axis S and away from the work surface 71, in portions.

To produce the ultrasonic weld connection, in a step a) the attachment part 10 is placed onto the bumper 30 in such a manner that the weld surface of the attachment part 10 is in contact with a weld region 31 of the bumper 30.

Then, in a step b), a part of the bumper 30 is deformed by action of the torsion sonotrode 70 in such a manner that the torsion sonotrode 70 can be brought into contact with the contact surface 12 (see FIG. 5). The sonotrode longitudinal axis S in this case is arranged at an angle β in relation to the attachment part longitudinal axis A, which angle is preferably less than 20°. By means of the torsion sonotrode 70, a force is then exerted upon the contact surface 12, such that the weld surface is pressed fully against the weld region 31.

Subsequently, in a step c) represented in FIG. 6, a torsional ultrasonic vibration is introduced into the weld portion 11 by means of the torsion sonotrode 70, as a result of which the weld surface becomes welded to the weld region 31. In this case, the attachment part longitudinal axis A and the sonotrode longitudinal axis S coincide, the attachment part 10 is partially accommodated in the cavity 72, and the outer attachment part portion 21 lies on an inner surface 33 of the bumper 30.

Obtained by this method is a composite part 90 according to the invention that is composed of the bumper 30 and the attachment part 10 connected thereto. A distance sensor can be fastened to the attachment part 10, and thus indirectly to the bumper 30, by means of the holding and latching lugs 17.

The invention claimed is:

1. An attachment part for connecting to a structural part, wherein
the attachment part has an attachment part longitudinal axis, and a weld portion to be welded to the structural part by torsional ultrasonic welding,
the weld portion has a contact surface for contact with a torsion sonotrode, and a weld surface for connecting to the structural part, and
the weld portion is delimited, at least portionally, by an inner vibration decoupling zone, and
the inner vibration decoupling zone, at least portionally, surrounds an inner portion of the attachment part.

2. The attachment part as claimed in claim 1,
wherein the inner vibration decoupling zone is inclined, at least portionally, in relation to the attachment part longitudinal axis or is parallel thereto.

3. The attachment part as claimed in claim 1,
wherein the inner vibration decoupling zone is realized substantially in a form of a conical surface.

4. The attachment part as claimed in claim 1,
wherein the inner vibration decoupling zone extends at an angle, in relation to the attachment part longitudinal axis, and the angle is in the range from 3° to 35°.

5. The attachment part as claimed in claim 1,
wherein the inner attachment part portion has a through-hole arranged concentrically in relation to the attachment part longitudinal axis.

6. The attachment part as claimed claim 1,
wherein the inner attachment part portion has a plurality of fastening portions, arranged concentrically with respect to the attachment part longitudinal axis, for fastening a functional part realized to correspond to the fastening portions.

7. The attachment part as claimed in claim 1,
wherein the weld portion is surrounded, at least portionally, by an outer vibration decoupling zone.

8. The attachment part as claimed in claim 1,
wherein the inner vibration decoupling zone and/or the outer vibration decoupling zone are/is formed by a multiplicity of decoupling openings and/or by one or more thinned regions of material.

9. The attachment part as claimed in claim 1,
wherein the weld surface is formed by at least one rib extending from the weld portion.

10. The attachment part as claimed in claim 1,
wherein the attachment part comprises a plastic.

11. A method for connecting an attachment part, as claimed in claim 1, to a structural part, the method comprising the following steps:
a) bringing the weld surface of the attachment part into contact with a weld region of the structural part,
b) exerting a force upon the contact surface by a torsion sonotrode, such that the weld surface is pressed against the weld region, and
c) introducing a torsional ultrasonic vibration into the weld portion by the torsion sonotrode such that the weld surface becomes welded to the weld region.

12. The method as claimed in claim 11,
wherein, before step b), at least a part of the structural part is deformed, by action of the torsion sonotrode, in such a manner that the torsion sonotrode can be brought into contact with the contact surface.

13. The method as claimed in claim 11,
wherein
the torsion sonotrode has a cavity for at least partially receiving the attachment part during step c), and
the cavity is circumferentially delimited by a wall, the outer side of which widens, at least portionally, in a direction of a sonotrode longitudinal axis and away from a work surface of the torsion sonotrode.

14. The method as claimed in claim 11,
wherein the torsion sonotrode has a sonotrode longitudinal axis and, before step c), the sonotrode longitudinal axis is arranged, at least temporarily, at an angle in relation to the attachment part longitudinal axis.

15. The method as claimed in claim 11,
wherein the structural part is an external or internal facing part of a motor vehicle.

16. A composite part including the attachment part, as claimed in claim 1 and a structural part, wherein the weld surface is welded to a weld region of the structural part.

* * * * *